No. 744,417. PATENTED NOV. 17, 1903.
P. SEIDEL.
LIGHT INDIGO POWDER.
APPLICATION FILED MAR. 1, 1901.
NO MODEL.
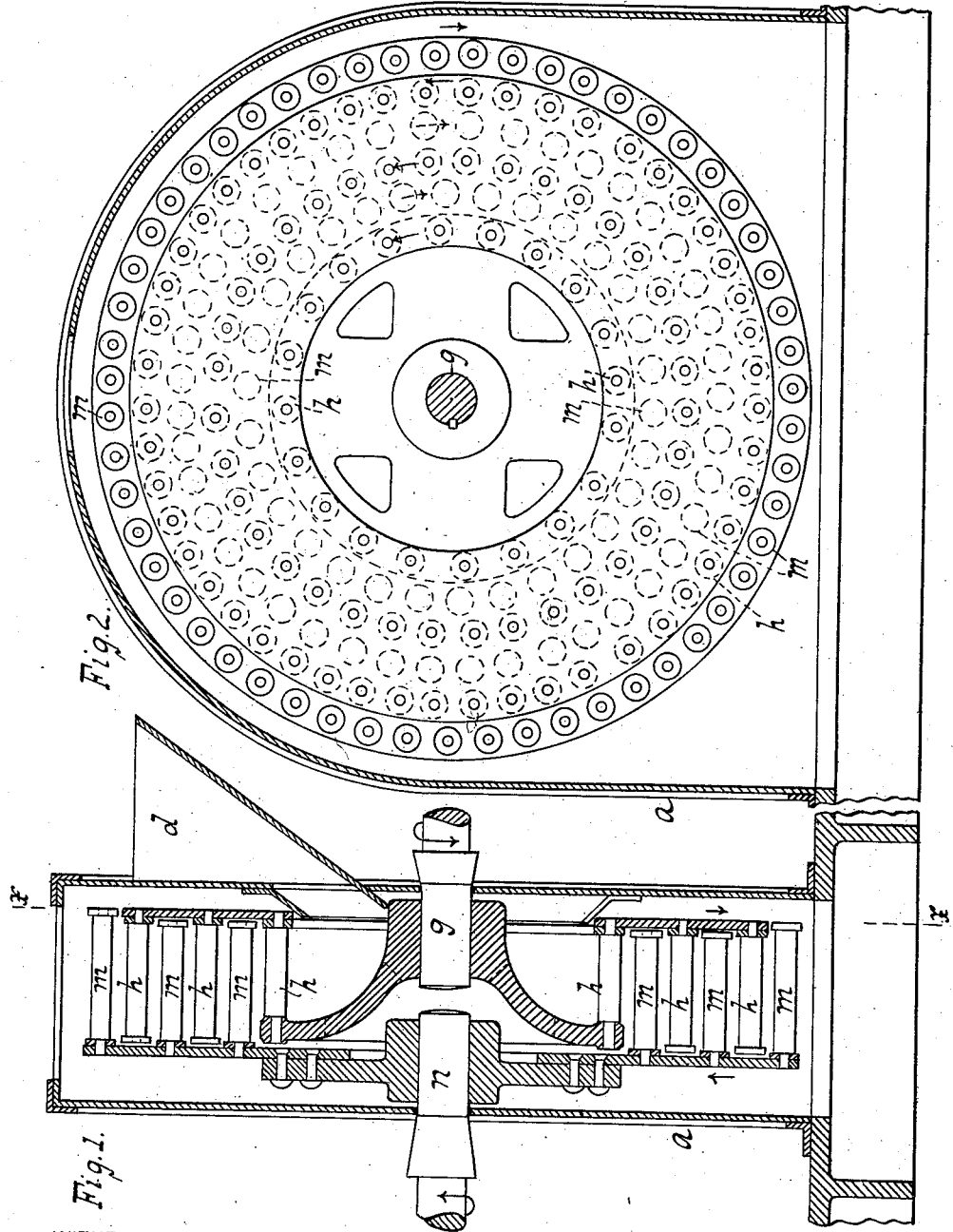
WITNESSES: INVENTOR
Paul Seidel
BY
Hauff & Hauff
ATTORNEYS.

No. 744,417.

Patented November 17, 1903.

UNITED STATES PATENT OFFICE.

PAUL SEIDEL, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

LIGHT INDIGO POWDER.

SPECIFICATION forming part of Letters Patent No. 744,417, dated November 17, 1903.

Application filed March 1, 1901. Serial No. 49,494. (No specimens.)

*To all whom it may concern:*

Be it known that I, PAUL SEIDEL, doctor of philosophy and chemist, a subject of the King of Saxony, residing at Ludwigshafen-on-the-Rhine, in the Kingdom of Bavaria, Germany, have invented new and useful Improvements in Light Indigo Powder, of which the following is a specification.

As is well known, indigo has to be prepared for use in vat-dyeing in the usual way by grinding to a high degree of fineness. For this purpose vegetable indigo has hitherto been ground in so-called "indigo-mills" in water sometimes containing caustic soda. This grinding is very frequently continued for days before a sufficiently-fine paste is obtained. Synthetic indigo in the form of paste possesses the advantage that it can be used directly without any further grinding in vat-dyeing; but such pastes have the disadvantage that in consequence of the water contained in them the cost of transport is heavy, and when importing into certain countries duty has to be paid on the entire weight, including that of the water.

All attempts to obtain indigo in the form of a dry powder by grinding the indigo in the usual indigo mills in the dry state have not yielded a product that could be at once used in the vat. The particles of indigo obtained apparently get pressed together, and hard flakes or even small lumps are formed. Also if the finely-divided indigo as obtained in the process of production be collected and dried there is always liability to aggregation taking place, resulting in the formation of particles of such size that they are with difficulty soluble in the vat or are liable to sink to the bottom of the vat, forming a sediment inoperative in the dyeing. This is frequently the case with dry synthetic indigo. In spite of the fine state of division in which synthetic indigo is at first obtained, the dry product has hitherto had to be submitted to wet grinding if intended for use in any other vat than the hydrosulfite vat, which possesses the most powerful reducing action.

In United States Letters Patent No. 671,344, of April 2, 1901, is described a process for obtaining indigo in a form readily soluble in the vat by converting it into its sulfite and decomposing the sulfite with water. Further experience shows that it is preferable to submit the improved product obtained in this way after drying to wet grinding before use.

The present invention consists in the conversion of dry indigo into a powder readily soluble in the vat by treatment in a disintegrator, and is particularly applicable to synthetic indigo and sufficiently pure brands of plant indigo; but impure vegetable indigo containing a large proportion of gummy or other impurities which tend to cement the indigo particles together cannot be treated with advantage.

In the accompanying drawings is shown an example of a suitable disintegrating apparatus.

In said drawings, Figure 1 is a sectional side elevation of a suitable apparatus which can be used in carrying out this invention. Fig. 2 is a section along the line $x\,x$ of Fig. 1.

The disintegrator, which does not grind by pressure, but submits the material under treatment to the shearing stress of blades rapidly passing one another, appears to tear the lumps of indigo apart, and it reduces the indigo to a fine powder, which is very light, soft, and voluminous. The single particles of indigo appear by the action of the disintegrator to be separated from one another by an envelop of air, so that the dry solid powder (provided, of course, that it is not subjected to pressure) occupies a space about equal to that of a twenty-per-cent. paste of indigo containing the same amount of indigo. One part of the new dry indigo powder thus obtained when thoroughly mixed with four (4) parts of water yields a homogeneous paste, which does not deposit indigo when allowed to stand undisturbed for three (3) months, and the indigo in such pastes is as easily soluble in the vat as is the indigo paste obtained by wet grinding. Its specific gravity is about 0.1 to 0.25, while the specific gravity of indigo powder as hitherto obtained is about 0.4 to 0.5—that is to say, my new form of indigo is in the dry state about from two (2) to four (4) times as light as any other form of indigo powder up to the present known. This process of producing indigo powder is entirely new, for according to the results hitherto attained by the use of such machines they have been regarded as practically only capable of producing more or less coarsely-grained material (see Parnicke, *Die Maschinellen Hilfsmittel der Chemischen Technik*, second edition, 1898, page 258) and of being more especially adapted for grinding hard and brittle masses, (see Lueger, *Lexikon der Gesammten Technik*, Vol. 3, page 267,) whereas according to this invention the indigo obtained is in an exceptionally fine state of division, and it is the harder varieties of commercial indigo which are least suited for conversion into powder by my new process. Also the usual process of grinding dry indigo in indigo-mills having failed to give satisfactory results, it was not to have been expected that my new process would improve upon the said results, but rather the contrary. It is clear, therefore, from the aforesaid that by my invention I have produced dry indigo not only in a state of exceedingly fine division, but in a new physical form, for in no case has it hitherto been possible to obtain an indigo powder which is so exceedingly voluminous and which by simple mixing with water yields a paste as easily soluble in the vat as is the indigo paste obtained by wet grinding.

The new product renders considerable simplification of the process of dyeing with indigo possible, for a considerable saving of time and material is effected in the grinding and the manipulation of the coloring-matter in the preparation of the vat and in keeping it up to strength is rendered easier.

Ordinary or any suitable disintegrators can be used for the purposes of my invention, as also such machines whose action depends on a similar principle. Good results have been obtained in machines of from two to two and a half feet diameter when rotating at the rate of seven hundred (700) to eight hundred (800) revolutions per minute.

I can identify a specimen of indigo in the new form invented by me, as follows: It is a light powder whose specific gravity lies between 0.1 and 0.25. A paste made up from one (1) part of indigo in this new form and four (4) parts of water will not deposit indigo on standing for three (3) months, whereas pastes similarly prepared from any hitherto-known dry indigo powder will deposit their indigo before the lapse of three (3) months. Indigo in the new form invented by me, made into a paste in the manner above set forth, will completely dissolve in a fermentation-vat within twenty-four hours, whereas pastes similarly prepared from any hitherto-known dry indigo powder will not dissolve in such vat. In carrying out this latter test I work as follows: The vat to be employed is made up from one hundred and fifty (150) parts of woad, ten (10) parts of bran, five (5) parts of Solvay soda, three (3) parts of lime, ten (10) parts of madder, and enough water to make about eight thousand (8,000) parts. Two thousand (2,000) parts of such a vat will dissolve one (1) part of indigo in the new form invented by me, made into a paste with water, as before described, within twenty-four (24) hours, whereas the same vat (in the same proportions of vat and indigo) will not dissolve a paste made from any hitherto-known dry indigo powder and within the same space of time.

Hereinafter I refer to the above-described vat as a "fermentation-vat."

In the accompanying drawings, in which, as before stated, is shown an example of a suitable disintegrating apparatus, a frame or support is shown at $a$ and a hopper at $d$. The shafts $g$ and $n$, or rather their disks or radiating portions, carry arms or rods $h$ and $m$. As one of these sets of arms rotates between the other, or the two sets rotate in opposite directions, a mass or lumps of material passing or dropping from chute $d$ will be disintegrated or torn into a suitable state of division. Any suitable pulley or driving arrangement can be applied for rotating the shafts.

Now what I claim is—

The new form of indigo which can be obtained as hereinbefore described, which is a powder whose specific gravity is within the range of from one-tenth (0.1) to twenty-five hundredths (0.25) and which after having been thoroughly moistened with water is capable of yielding a homogeneous paste containing twenty (20) per cent. of indigo which does not deposit indigo on standing undisturbed for three (3) months and which is dissolved by a hereinbefore-described fermentation-vat, substantially as described.

In testimony whereof I have hereunto set my hand in the presence of two subscribing witnesses.

PAUL SEIDEL.

Witnesses:
JOHN L. HEINKE,
PERCY J. JONES.